US012248575B2

(12) United States Patent
Pinchuk et al.

(10) Patent No.: US 12,248,575 B2
(45) Date of Patent: Mar. 11, 2025

(54) SYSTEM AND METHOD FOR MONITORING DELIVERY OF MESSAGES PASSED BETWEEN PROCESSES FROM DIFFERENT OPERATING SYSTEMS

(71) Applicant: AO Kaspersky Lab, Moscow (RU)

(72) Inventors: Stanislav V. Pinchuk, Moscow (RU);
Andrey Y. Simanovsky, Moscow (RU);
Sergey V. Rogachev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 405 days.

(21) Appl. No.: 17/835,034

(22) Filed: Jun. 8, 2022

(65) Prior Publication Data

US 2023/0074455 A1 Mar. 9, 2023

(30) Foreign Application Priority Data

Sep. 6, 2021 (RU) .......................... RU2021126158

(51) Int. Cl.
*G06F 15/16* (2006.01)
*G06F 9/455* (2018.01)
(Continued)

(52) U.S. Cl.
CPC .......... *G06F 21/57* (2013.01); *G06F 9/45558* (2013.01); *G06F 9/546* (2013.01);
(Continued)

(58) Field of Classification Search
CPC ...... G06F 21/57; G06F 9/45558; G06F 9/546; G06F 2009/45587; G06F 2221/034
See application file for complete search history.

(56) References Cited

U.S. PATENT DOCUMENTS 7,266,726 B1 * 9/2007 Ladd ...................... H04L 41/06
714/E11.147
7,987,469 B2 * 7/2011 Magro ................ G06F 9/45533
718/1
(Continued)

OTHER PUBLICATIONS

Habeeb Richard, "Improving the Security of Building Automation System through an Sel4 Based Communication Frame" Retrieved from Internet Mar. 10, 2022, digitalcommons.usf.edu/cgi/viewcontent.cgi?article=8358&context=etd pp. 11-21, Figure 4.1.

*Primary Examiner* — Oleg Survillo
(74) *Attorney, Agent, or Firm* — ArentFox Schiff LLP; Michael Fainberg

(57) ABSTRACT

Disclosed herein are systems and methods for monitoring delivery of messages passed between processes from different operating systems. In one aspect, an exemplary method comprises, creating a proxy process in a first Operating System (OS) for a second process, wherein the second process is from a second OS, the first and second OS being installed in respective computing environments, assigning at least one security policy to the created proxy process for monitoring delivery of messages associated with the created proxy process, where the messages are transmitted through a programming interface of the created proxy process corresponding to a programming interface of the second process, generating a security monitor for the first OS based on the created proxy process and security policies of the first OS, and monitoring the delivery of messages between at least a first process in the first OS and the second process based on the security policies.

20 Claims, 11 Drawing Sheets

(51) Int. Cl.
*G06F 9/54* (2006.01)
*G06F 21/57* (2013.01)

(52) U.S. Cl.
CPC .............. *G06F 2009/45587* (2013.01); *G06F 2221/034* (2013.01)

(56) References Cited

U.S. PATENT DOCUMENTS

| | | | |
|---|---|---|---|
| 8,336,050 | B2 | 12/2012 | Dake |
| 8,627,069 | B2* | 1/2014 | Clermont ................. G06F 21/53 726/17 |
| 11,023,296 | B2* | 6/2021 | Lu ........................... G06F 9/451 |
| 2004/0243715 | A1* | 12/2004 | Yokoyama ............ H04L 67/568 709/231 |
| 2010/0154037 | A1* | 6/2010 | Sabin .................. H04L 63/1408 709/204 |
| 2013/0176848 | A1* | 7/2013 | Jinzaki .................... H04L 47/20 370/230.1 |
| 2016/0092672 | A1* | 3/2016 | Li ........................... G06F 21/51 726/22 |
| 2017/0372082 | A1* | 12/2017 | Kagarlitsky .......... G06F 21/608 |
| 2019/0266502 | A1* | 8/2019 | Moser ................. G06F 11/3409 |
| 2022/0109741 | A1* | 4/2022 | Chen ....................... H04L 69/40 |

* cited by examiner

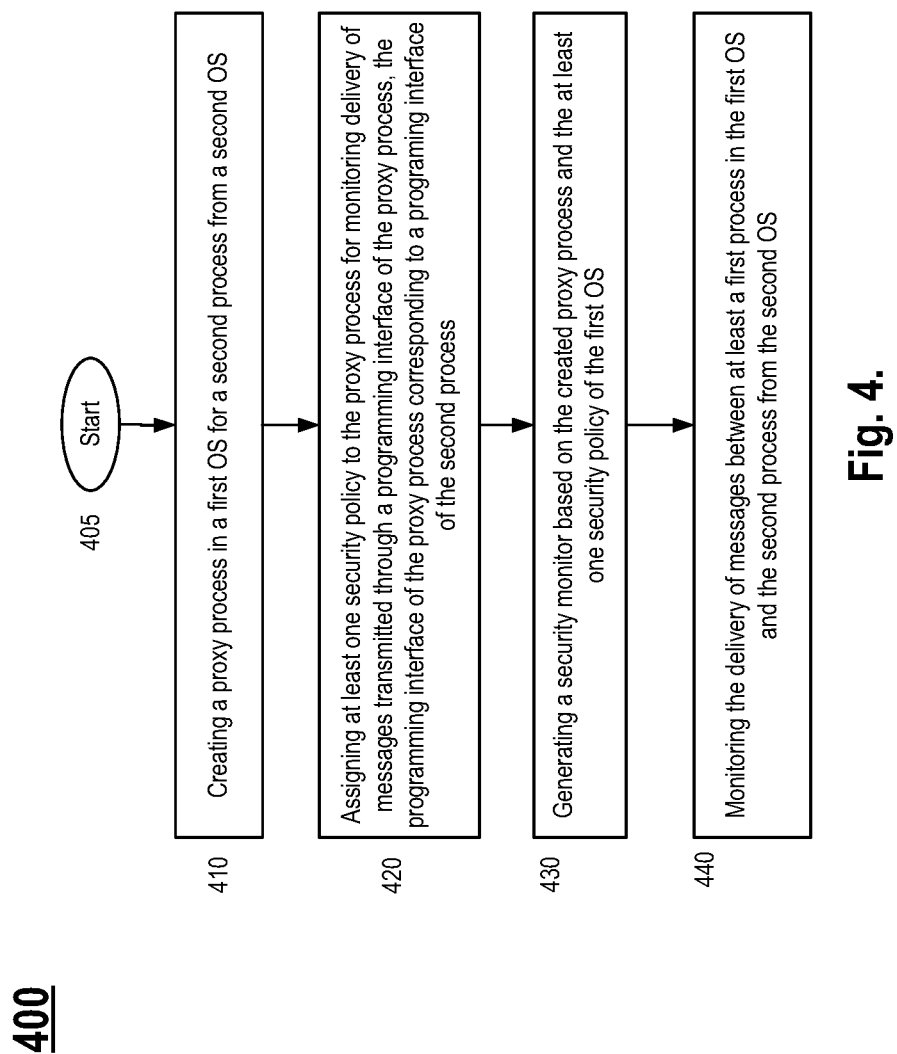

SYSTEM AND METHOD FOR MONITORING DELIVERY OF MESSAGES PASSED BETWEEN PROCESSES FROM DIFFERENT OPERATING SYSTEMS

CROSS REFERENCE TO RELATED APPLICATIONS

The present application claims priority to Russian Patent Application No. 2021126158, filed on Sep. 6, 2021, the entire content of which is incorporated herein by reference.

FIELD OF TECHNOLOGY

The present disclosure relates to the field of information security, e.g., by monitoring messages passed between processes.

BACKGROUND

Modern operating systems (hereafter OS) are complex information systems with a large set of installed software for performing a wide variety of functions. At the same time, software developers are constantly working to correct bugs and expand the functionality of the software. However, this quantity and range of software carries significant information security risks due to vulnerabilities in the software and also the possibility of unauthorized installation of malicious software. The first layer of protection against these threats is the features of the OS architecture as well as the built-in security tools of the OS, since it is the OS that provides the mechanisms for processing and monitoring inter-process communication, which can be implemented, inter alia, by exchanging messages between processes.

Many popular operating systems (for example, Windows 9x, Linux, Android, etc.) use a monolithic kernel, which has a number of advantages, for example, performance and the simplicity of communication between drivers. However, due to the large number of kernel software modules and, as a result, the high probability of errors in the code, it is difficult to ensure the reliability and security of a monolithic OS. Thus, if a vulnerability exists in the OS, delivery of certain unwanted or malicious messages may be allowed between processes by the means for inter-process communication processing and control. An example of such a malicious message between processes is a message requesting access to a protected area of memory. Another type of OS kernel is a microkernel (for example, the KasperskyOS, Symbian, etc. kernels), which provides a minimum set of elementary process control and abstraction functions for working with the hardware. The microkernel architecture of the OS is characterized by the small size of the microkernel and the trusted computing platform. This contributes to a higher level of reliability and security of the OS's microkernel architecture, since it is easier to verify the correctness of a small amount of microkernel code. However, this type of OS architecture typically has lower performance. There are also operating systems with hybrid kernels (such as MacOS X, Windows NT, etc.), which allow the operating system to take advantage of the well-structured microkernel architecture of the OS while maintaining the performance of the monolithic kernel.

A current function of operating systems is to ensure the reliability and security of inter-process communications implemented by exchanging messages between processes. An even more challenging task is that of securing inter-process communications between the first and second processes, where the second process is executed in an environment that is hardware- or software-isolated from the first execution environment in which the first process is executed. For example, the second process can be executed on a second computer that is connected to the first computer over a network, on a virtual machine, or in other execution environments. In this case a technical problem arises due to the complexity of monitoring the delivery of inter-process communication messages between processes from different operating systems to comply with the security policy. In order to comply with policy, typical technologies disallow monitoring of the delivery of inter-process communication messages between processes from different operating systems.

Therefore, there is a need for a method and a system for improving information security while monitoring of the delivery of inter-process communication messages between processes from different operating systems.

SUMMARY

Aspects of the disclosure relate to information security, more specifically, to systems and methods of monitoring delivery of messages passed between processes from different operating systems (OSs). The method of the present disclosure improves the OS security for the exchange of inter-process communication messages passed between first and second processes from different operating systems, by creating a proxy process for sending and receiving messages from the second process which has a programming interface for the proxy process, and adding a security policy for monitoring the delivery of messages associated with the given proxy process. The method also increases the level of monitoring of the delivery of inter-process communication messages passed between first and second processes which are being executed on different operating systems.

In one exemplary aspect, a method is provided for monitoring delivery of messages passed between processes from different operating systems, the method comprising: creating a proxy process in a first Operating System (OS) for a second process, wherein the second process is from a second OS, the first and second OS being installed in respective computing environments, assigning at least one security policy to the created proxy process for monitoring delivery of messages associated with the created proxy process, where the messages are transmitted through a programming interface of the created proxy process corresponding to a programming interface of the second process, generating a security monitor for the first OS based on the created proxy process and security policies of the first OS, and monitoring the delivery of messages between at least a first process in the first OS and the second process, wherein the monitoring of the delivery of messages associated with the proxy process is based on the security policies.

In one aspect, the monitoring of the delivery of messages includes, for each message, at least an authorization or a prohibition of the delivery of the message.

In one aspect, the messages comprise at least one of: a request to launch a process, a request and a reply for implementing of communication between processes, and a process request to the security monitor.

In one aspect, the second OS comprises at least one of: a guest OS running on a virtual machine under a control of the first OS on a first computer, a guest OS running on a virtual machine, the first OS being a second guest OS running on a second virtual machine and connected to the first virtual machine through a hypervisor, and a second OS on a second computer that is connected to the first computer that is running the first OS over a network.

In one aspect, the security monitor is generated for the first OS using a generating tool.

In one aspect, the security monitor is generated based on features of an architecture of the first OS, the features including at least the created proxy process and the security policies assigned to the proxy process, the security policies being obtained from a security policy database.

In one aspect, the security monitor is generated by creating a code of the security monitor, the created code including at least one of: a source code, an intermediate code, and an executable code.

In one aspect, when monitoring the delivery of messages, the security monitor uses the programming interface of the proxy process to determine allowed messages for the proxy process, and a policy assignment tool is used to additionally specify a list of allowed messages according to the programming interface and to assign a security policy that prohibits the delivery of messages from the proxy process, when the security monitor detects an attempt to deliver messages that are not in the list of allowed messages.

In one aspect, when monitoring the delivery of messages, the security monitor uses the programming interface of the proxy process to determine a list of processes with which the proxy process is allowed to exchange messages, and a policy assignment tool is used to additionally assign a security policy that prohibits messages from being exchanged between the proxy process and processes that are not in the list of processes, wherein the list of processes includes at least the first process.

In one aspect, the proxy process is created for at least two processes of the second OS when a programming interface for exchanging messages exists between said at least two processes of the second OS.

In one aspect, the security policies use a model based on at least one of: basic operations, a finite state machine, a timed automation, a role-based access control, a mandatory integrity control, regular expressions, discrete events, object capability model, and a temporal logic.

According to one aspect of the disclosure, a system is provided for monitoring delivery of messages passed between processes from different operating systems, the system comprising at least one hardware processor of a first computer configured to: create a proxy process in a first Operating System (OS) for a second process, wherein the second process is from a second OS, the first OS being installed in the first computer and the second OS being installed in a different computing environment from the first computer, assign at least one security policy to the created proxy process for monitoring delivery of messages associated with the created proxy process, where the messages are transmitted through a programming interface of the created proxy process corresponding to a programming interface of the second process, generate a security monitor for the first OS based on the created proxy process and security policies of the first OS, and monitor the delivery of messages between at least a first process in the first OS and the second process, wherein the monitoring of the delivery of messages associated with the proxy process is based on the security policies.

In one exemplary aspect, a non-transitory computer-readable medium is provided storing a set of instructions thereon for monitoring delivery of messages passed between processes from different operating systems, wherein the set of instructions comprises instructions for: creating a proxy process in a first Operating System (OS) for a second process, wherein the second process is from a second OS, the first and second OS being installed in respective computing environments, assigning at least one security policy to the created proxy process for monitoring delivery of messages associated with the created proxy process, where the messages are transmitted through a programming interface of the created proxy process corresponding to a programming interface of the second process, generating a security monitor for the first OS based on the created proxy process and security policies of the first OS, and monitoring the delivery of messages between at least a first process in the first OS and the second process, wherein the monitoring of the delivery of messages associated with the proxy process is based on the security policies.

The method and system of the present disclosure are designed to provide information security, in a more optimal and effective manner, enabling messages from processes executed on different OS s to be monitored.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 illustrates a method for monitoring delivery of messages passed between first and second processes in accordance with aspects of the present disclosure.

DETAILED DESCRIPTION

Exemplary aspects are described herein in the context of a system, method, and a computer program for monitoring delivery of messages passed between processes from different operating systems in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to describe the teachings of the present disclosure with clarity, a brief summary of terms used throughout the disclosure is first provided below.

A process refers to a sequence of operations in an execution of a program or a part thereof together with useful data, which includes one or more threads and associated system resources.

Inter-process communication (IPC) refers to a set of methods for exchanging data between multiple threads in one or more processes. The processes can be launched on one or more computers that are connected to each other via the network. IPC methods may be divided into methods of message passing, synchronization, shared memory, and remote procedure calls.

An operation refers to an elementary action performed within the process under consideration (an example of an operation can be an API function). A modern operating system uses both synchronous and asynchronous operations to exchange data between two processes using inter-process communication methods.

A security domain refers to a part of an automated system that implements the same security policies.

A finite state machine (FSM) refers to a model of a discrete device characterized by states and transitions from one state to another. Each state of the finite state machine characterizes one of the possible situations in which the finite state machine may be located.

Figure 1A:
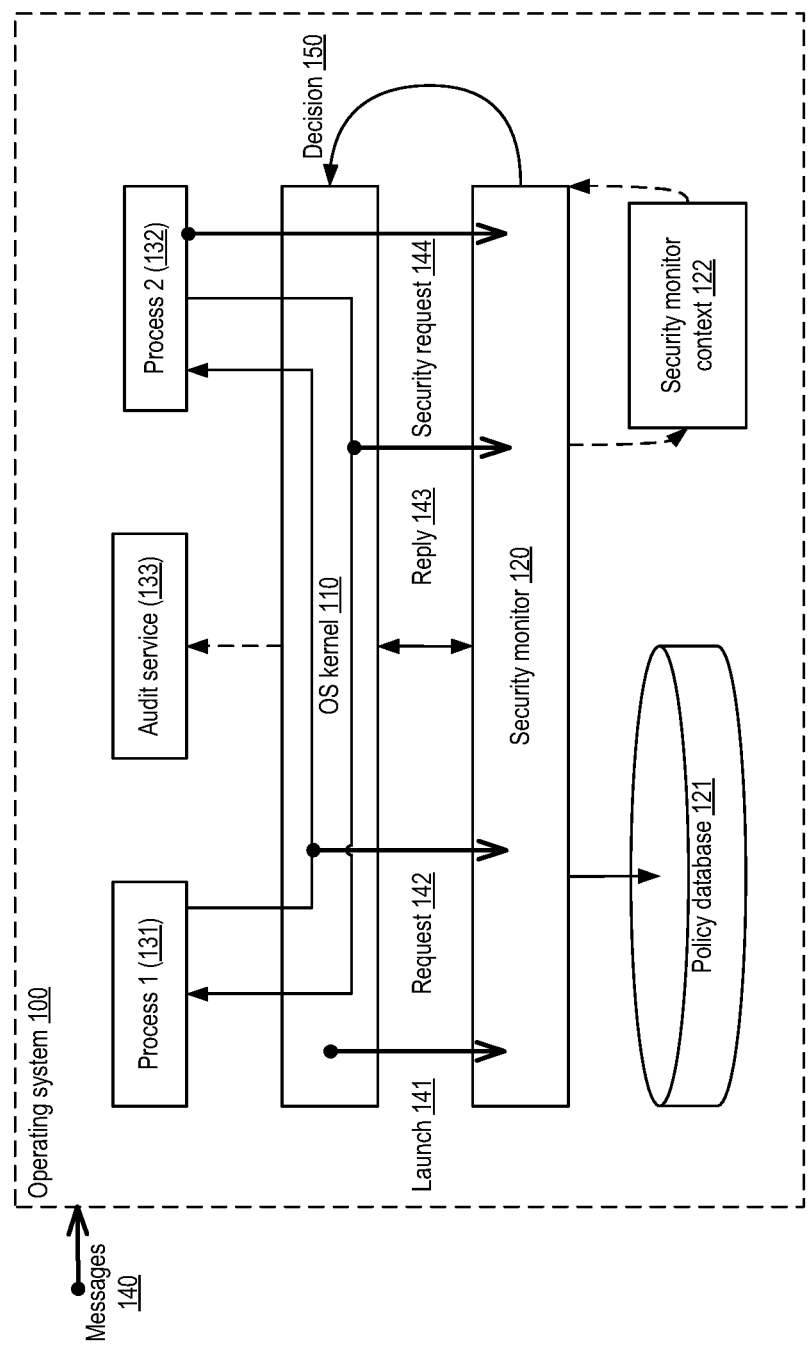
FIG. 1a to FIG. 1e illustrate block diagrams of exemplary inter-process communications using a security monitor based on an example of an operating system with a micro-kernel architecture in accordance with aspects of the present disclosure.
Figure 1B:
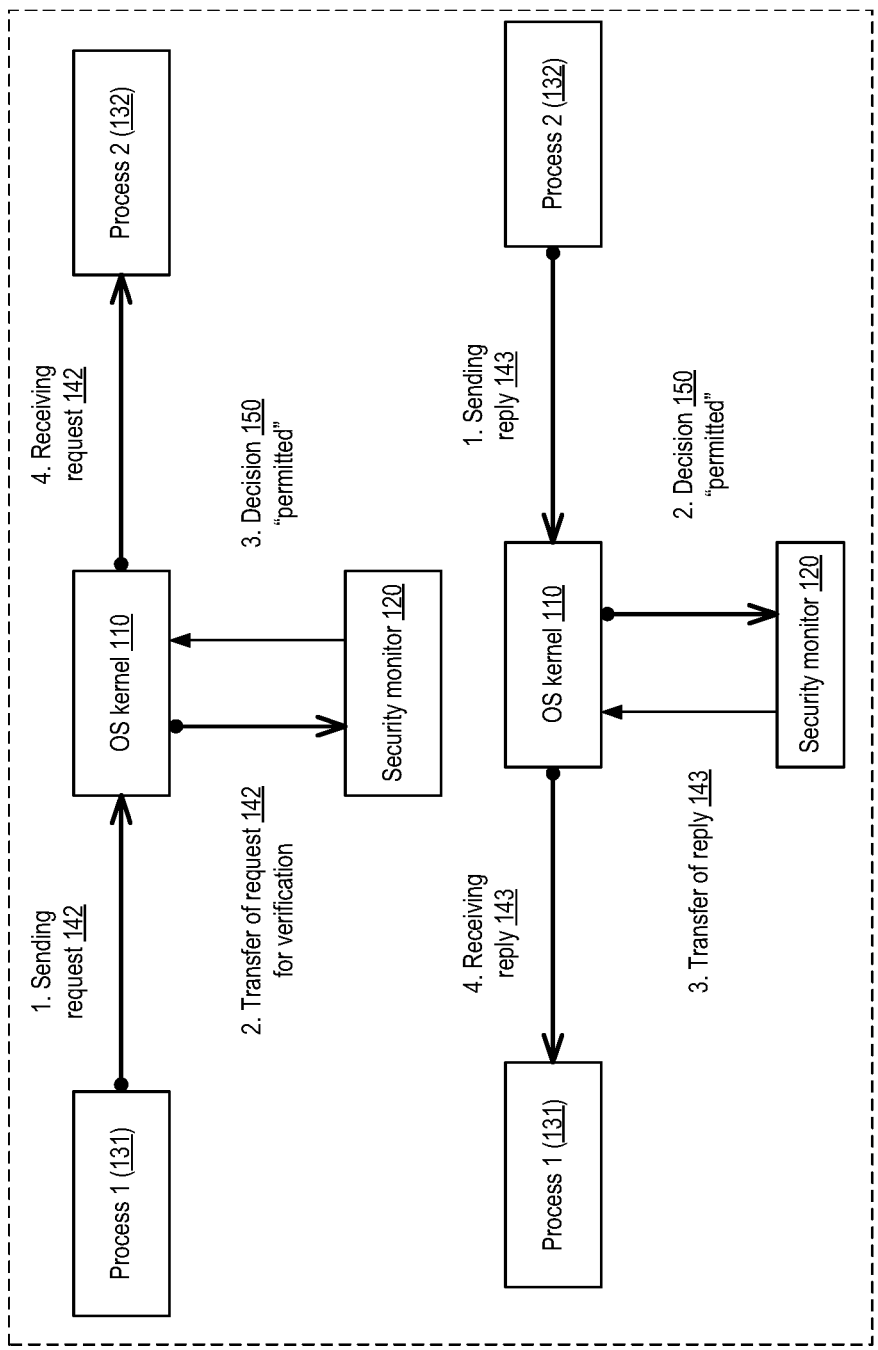

FIGS. 1a-1b illustrate block diagrams of inter-process communications using a security monitor 120 based on an example of an operating system 100 with a microkernel architecture, in accordance with aspects of the present disclosure. The OS 100 shown in FIG. 1a includes isolated processes 131-132 of applications of the OS 100 that communicate with one another through inter-process communication, as well as with the OS kernel 110 by means of programming interfaces using messages 140 (also inter-process communication messages, IPC messages). Referring to FIG. 1a, for clarity, the inter-process communication messages are indicated by a bold arrow starting with a dot. Messages 140 include the following: a request to launch 141 from a process 131, a request 142 from the process 131 or a response 143 from another process 132 (for example, calls to a method of process 132 by process 131), a process request 132 to the security monitor 120 (such as security request 144). It is worth noting that messages 140 in the present disclosure are understood to mean inter-process communication messages, in general providing the facility for communication between different processes of the OS 100, including the processes 131-132. The security monitor 120 is a component of the OS 100 designed to monitor the delivery of the above-mentioned messages 140. Details of the implementation of the security monitor 120 will be disclosed below. The messages 140 may also include an error notification from the OS kernel 110 in response to the messages 140 from processes 131-132. In this case, the above-mentioned interfaces implemented by the processes are data structures containing declared methods which implement the functionality of the corresponding process.

The above mentioned interfaces are statically defined and the allowed communications between the processes are defined in advance. In one aspect, the messages 140 are sent and received by processes 131-132 using system calls to the OS kernel 110.

In one aspect, the system calls may include the following:
call( ): used by the process 131 to send a request 142 to the process 132 and receive a reply 143 to perform inter-process communication;
recv( ): used by process 132 to receive the request 142; and
reply( ): used by process 132 to send the reply 143 to process 131.

In one aspect, the system call reply( ) is executed in the same process thread in which the call recv( ) was executed.

Figure 5:
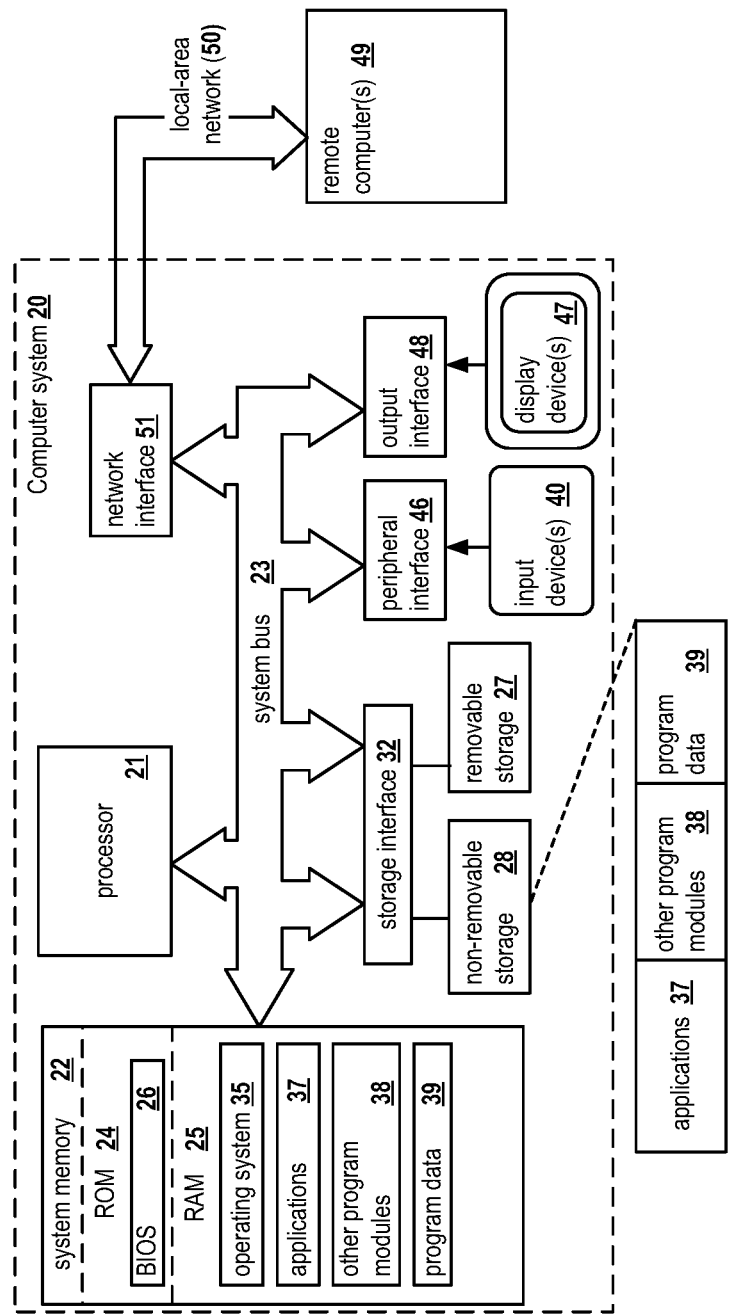
FIG. 5 presents an example of a general purpose computer system on which aspects of the present disclosure can be implemented.

The security monitor 120 is implemented with the ability to run on a computer processor running the OS 100 (an example of a general purpose computer 20 is shown in FIG. 5). The security monitor 120 monitors the delivery of the messages 140 based on decisions 150. The decisions 150 are based on security policies obtained from the policy database 121. The policy database 121 is stored on a machine-readable computer medium (in memory) on which the OS 100 is installed, for example, on the storages 27 or 28 of the computer 20 (see FIG. 5). In one aspect, the monitoring of the delivery of the message 140 includes authorizing or prohibiting delivery of a message 140 and, respectively, authorizing or prohibiting the execution of communication that uses the message 140. In one aspect, the decision 150, by the security monitor 120, of the method for monitoring the delivery of the message 140 indicates either an authorization or a prohibition of a transmission of the message 140 in compliance with the security policy. In one aspect, the decision 150 is used, by the security monitor 120 or its components, to implement the monitoring of the delivery of the messages 140 (see FIG. 2a). Based on the security policies from the policy database 121, the decision 150 may be issued using the data in the message 140 (for example, the name of the process to be launched or the actual arguments of the process method called).

Also, the decision 150 on the method for monitoring the delivery of the message 140 may depend on the correctness of the structure of the message 140. Thus, if the message 140 has an invalid structure, the transmission of the message 140 may be prohibited. In this case, valid structures of the messages 140 may be defined using a declarative description of the interface of the process-receiver of the message 140. The above-mentioned structure may contain the size of the message 140, valid arguments and other valid parameters of the message 140.

In one aspect, the security monitor 120 may be part of the OS kernel 110, or a separate application executed on the computer's processor.

In another aspect, the security monitor 120 runs on the computer's processor in the privileged mode of the OS kernel 110.

One aspect of the OS 100 additionally may include an audit service 133, designed to log results of the monitoring of the delivery of the messages 140. In this case, the monitoring of the delivery of the message 140 additionally may include performing an audit using the audit service 133. In another aspect, the security monitor 120 may perform monitoring of the delivery of messages 140, additionally taking account of a current status of the audit service 133.

In one aspect, the status of the audit service 133 indicates that the audit service 133 is ready to receive and store messages 140. For example, if the process 131 sends a request 142 to a secure resource (via the process 132) where the information about access to the secure resource should always be logged but the status of the audit service 133 indicates that the audit service 133 is not currently saving the messages 140, then such a request 142 will be denied by the security monitor 120 in accordance with the security policy.

In another aspect, the OS 100 may contain the security monitor context 122, wherein the security monitor 120 monitors the delivery of the messages 140 additionally taking into account the security monitor context 122, where the security monitor context 122 contains values of security policy parameters.

In another aspect, the security monitor 120 may additionally be designed to change the security monitor context 122 taking into account the decisions 150 based on the security policies obtained from the policy database 121.

In one aspect, the security policies use a finite state machine model, a mandatory integrity control model, or other models to implement the security policies. Details of these models will be described later in conjunction with the description of FIG. 2a. Depending on the models used by the security policies, the security monitor context 122 may contain different security policy parameters. For example, for security policies based on a mandatory integrity control model, the security monitor context 122 may contain values for integrity levels and access levels to protected resources. For security policies based on a finite state machine, the security monitor context 122 may contain a current value of the state of the finite state machine and a transition table of the finite state machine.

FIG. 1b illustrates an example block diagram of inter-process communications for monitoring a delivery of an allowed request 142 from a process 131 to a process 132 using a security monitor 120, in accordance with aspects of the present disclosure. The process 131 can call an interface method of the process 132. As such, the process 131 calls the interface method of process 132 by sending a request 142 containing the input arguments of the called method. Process 131 sends the request 142 via the OS kernel 110, which in turn sends the request 142 to the security monitor 120 for verification. The security monitor 120 issues the decision 150 "permitted" based on the security policies and transfers this decision 150 to the OS kernel 110. Then, the kernel 110 forwards the request 142 based on the decision 150 to process 132.

For the example shown in FIG. 1b, process 132 then sends a reply 143 to process 131, where the reply 143 contains the output arguments of the called method. The method for sending the reply 143 is the same as the method for sending the request 142, but in reverse order, from process 132 to process 131. That is, the process 132 sends a reply 143 using the OS kernel 110, which in turn sends a reply 143 to the security monitor 120 for verification. The security monitor 120 issues a new decision 150 "permitted" based on the security policies and transfers this new decision 150 back to the OS kernel 110. Then, the kernel 110, based on the new decision 150, forwards the reply 143 to process 131.

Figure 1C:
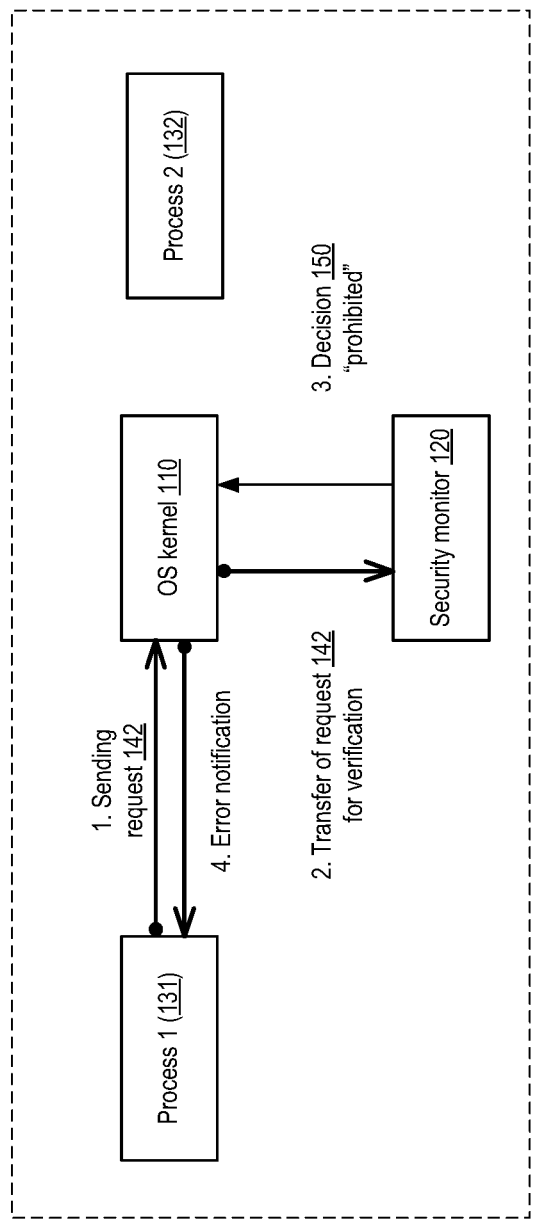

FIG. 1c illustrates an example block diagram of inter-process communications for monitoring a delivery of a denied request 142 from a process 131 to a process 132 using a security monitor 120, in accordance with aspects of the present disclosure. Process 131 sends the request 142 via the OS kernel 110, which in turn sends the request 142 to the security monitor 120 for verification. The security monitor 120 issues the decision 150 "prohibited" based on the security policies and transfers this decision 150 to the OS kernel 110. The kernel 110 then sends an error notification to process 131 based on the decision 150. In this case, the request 142 will not be transferred to process 132.

Figure 1D:
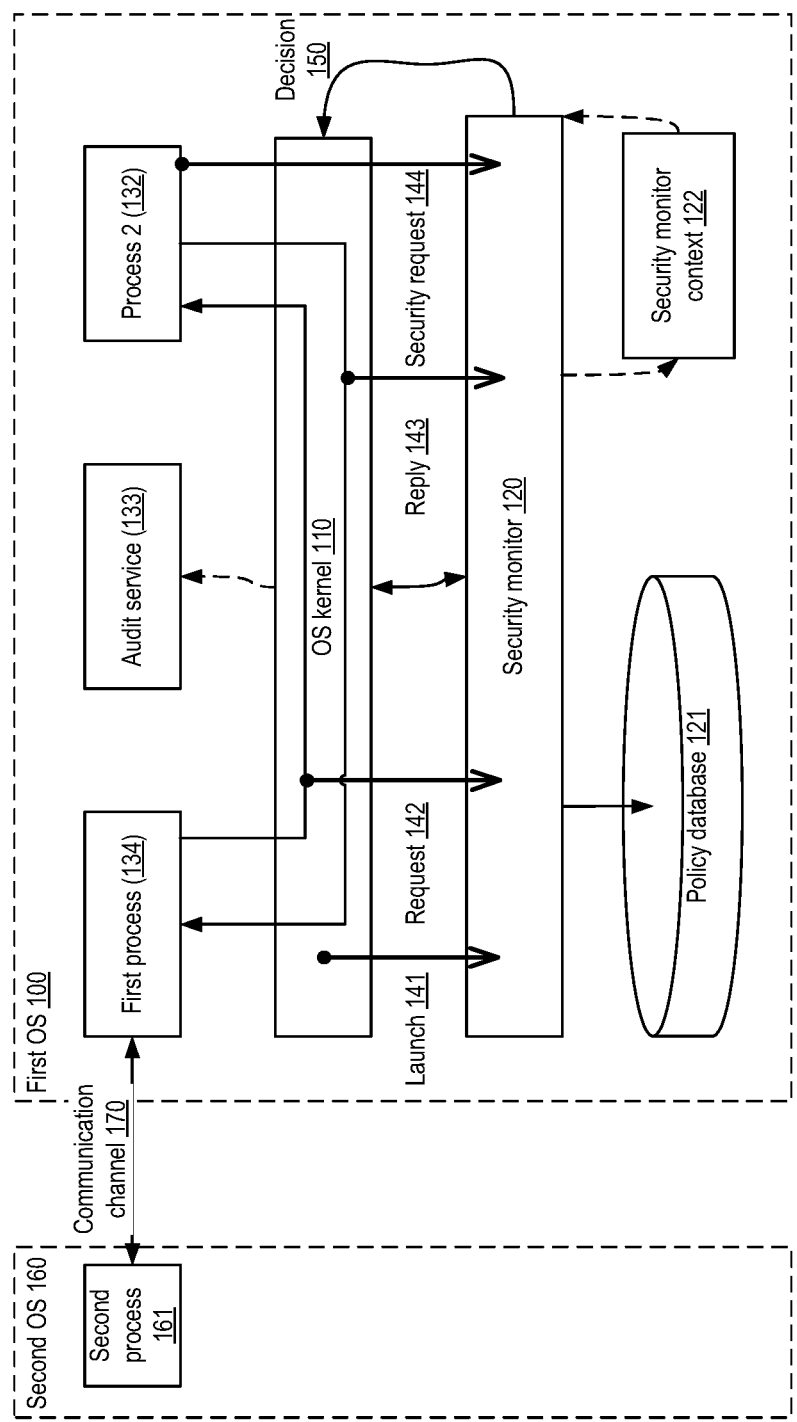

FIG. 1d illustrates an example block diagram of communication between the first process 134, implemented in the first OS 100, and the second process 161, implemented in the second OS 160, via a communication channel 170, which is not monitored by the security monitor 120. For ease of presentation, here and below the first OS is referred to as OS 100 (see FIG. 1a). It is worth noting that the second OS 160 can be any OS, the architecture of which may be known in the relevant art. Thus, the second OS 160 may include the operating system 100, the architecture of which is represented in FIG. 1a. As such, the first OS 100 and the second OS 160 can be either different OS's (that is, they may have different OS architectures) or the same OS, but with the key difference that the first OS 100 and the second OS 160 are installed in different computing environments. Thus, in the exemplary aspects, the first OS 100 and the second OS 160 can be installed on different computers, virtual machines, or in mutually isolated software or hardware computing environments, which in turn are implemented with the ability to run on the computer 20 (see FIG. 5). One example of technology for isolating computing environments is the TrustZone technology.

Thus, the first process 134 communicates with the second process 161 using the communication channel 170, such as a computer network, a virtual machine transport mechanism (for example, the paravirtualization extension VirtIO), and another communication channel depending on the computing environments on which the first OS 100 and the second OS 160 are installed. However, there are several disadvantages to the communication illustrated in FIG. 1d. Specifically, for the communication between the first process 134 and the second process 161, the delivery of the messages 140 which are exchanged between these processes occurs over the communication channel 170, which cannot be monitored by the security monitor 120 for ascertaining compliance with security policy 121. This reduces the security of the first OS 100 when exchanging messages 140 passed between the first 134 and the second 161 processes. Thus, the example of the communication between the first 134 and the second 161 processes presented in FIG. 1d does not solve the stated technical problem. In contrast, as shown in FIG. 1e, for the communication between the first process 134 and the second process 161, the method of the present disclosure can be used to solve the specified technical problem.

Figure 1E:
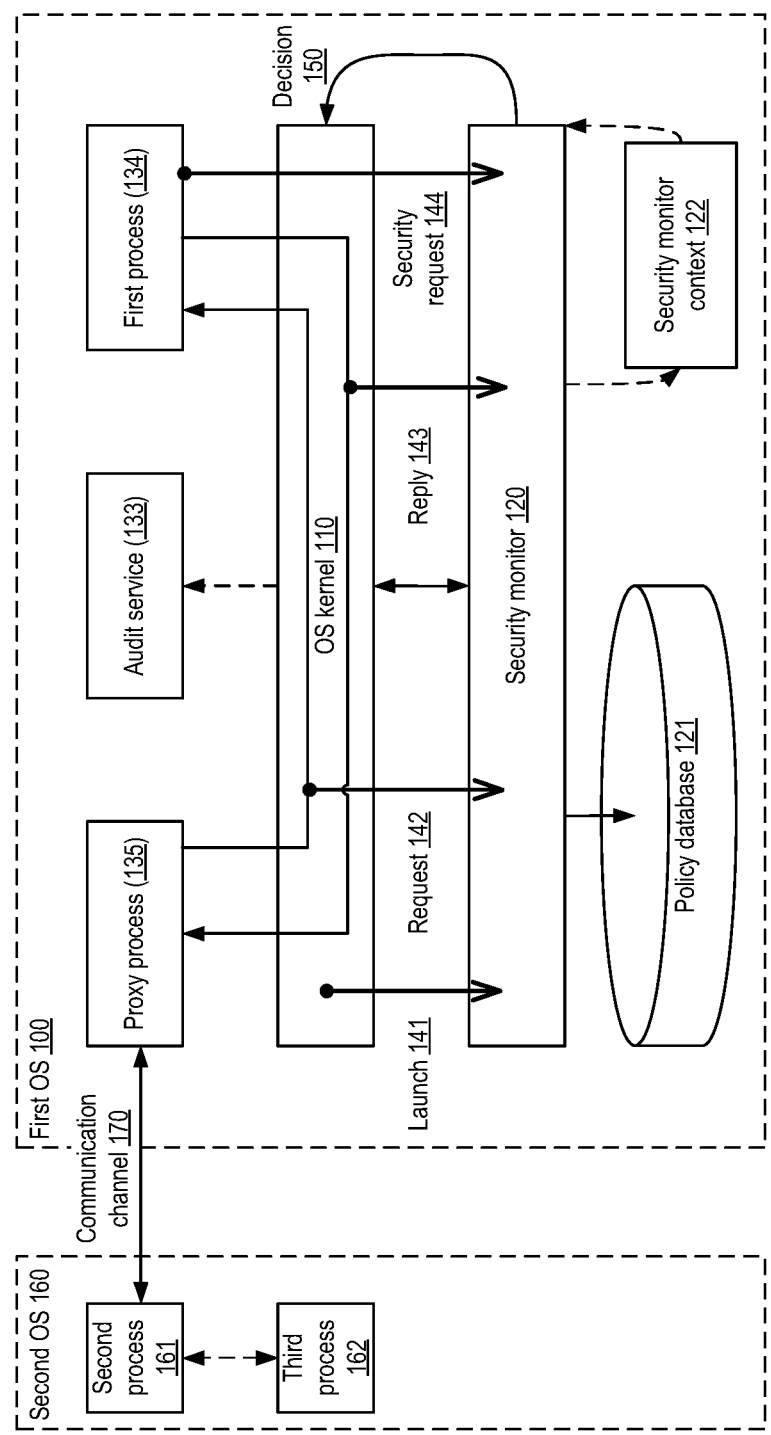

FIG. 1e illustrates an example block diagram of a secure communication between the first process 134, implemented in the first OS 100, and the second process 161, implemented in the second OS 160 in accordance with aspects of the present disclosure. It is worth noting that in general, the second process 161 may communicate with multiple processes in the first OS 100, one of which is represented in the figure as the first process 134. However, for ease of presentation, only the first process 134, which communicates with the second process 161, will be considered in the following description. As in the previous example shown in FIG. 1d, the first OS 100 is connected to the second OS 160 via a communication channel 170 that is not monitored by the security monitor 120. The second OS 160 can be any OS with an architecture known from the prior art, including the operating system 100, the architecture of which is shown in FIG. 1a. The first OS 100 and the second OS 160 can be installed on different computers, virtual machines, or in computing environments isolated from each other in software or hardware, which in turn are implemented with the ability to run on the computer 20 (see FIG. 5). However, the second process 161 does not communicate with the first process 134 directly, but using a previously created proxy process 135. In this case, the proxy process 135 shown in the first OS 100 (but not in the second OS 160), is designed for exchanging messages 140 with the second process 161 via the communication channel 170 and has a programming interface corresponding to the programming interface of the second process 161.

In one aspect, when monitoring the delivery of messages 140 the security monitor 120 uses the programming interface of the proxy process 135 to determine the allowed messages 140 for the proxy process 135. However, at least one security policy is pre-defined in the policy database 121 to prevent the delivery of messages 140 from the proxy process 135 if the security monitor 120 has detected an attempt to deliver messages 140 that are not in the allowed list. In this case, the list of allowed messages 140 and the corresponding security policies are pre-defined using the policy assignment tool 290 when the security monitor 120 is generated (see FIG. 2a-2b). Thus, the first process 134 communicates with the proxy process 135 by sending interprocess communication messages 140 and under the control of the security monitor 120, while the proxy process 135 is connected to the second process 161 via the communication channel 170, wherein the security monitor 120 does not monitor the communication channel 170.

In a preferred aspect, in the second OS 160 there is a separate proxy process corresponding to each second process. For example, the proxy process 135 corresponds to the second process 161, and the second proxy process (not shown in the figure), different from the proxy process 135 corresponds to the third process 162. In addition, in a preferred embodiment, the processes 161 and 162 are not interconnected. In this case, in one aspect, in the second OS 160, the second process 161 can be connected to the third process 162 using the application interface for exchanging messages 140. In this example, it is possible to use one proxy process 135 common to both mentioned processes 161 and 162. Thus, the processes 161 and 162 form a single security domain, communication with which takes place through a single proxy process 135, which also allows the communication between the second 161 and third 162 processes of the second OS 160 to be monitored. It is worth noting that the aforementioned security domain, which includes the processes 161 and 162, may also include more processes of the second OS 160, not shown in the figure. In another scenario, when the second OS 160 contains multiple distinct security domains, wherein each distinct security domain includes at least one second process, a separate proxy process may be defined in the first OS 100 for each of the distinct security domains.

The above system (as shown in FIG. 1e) used for communication between the first 134 and second 161 processes allows the specified technical problem to be solved and the stated technical results to be achieved, namely to improve the security of an OS during the exchange of messages 140 for inter-process communication passed between the first 134 and the second 161 processes of different operating systems. The technical problems are solved by: creating a proxy process 135 for sending and receiving messages 140 from the second process 161, wherein the second process 161 has a programming interface for the proxy process 135; adding a security policy for monitoring the delivery of messages 140 related to the aforementioned proxy process 135, and increasing the monitoring of the delivery of messages 140 for inter-process communication passed between the first 134 and the second 161 processes. More information about aspects of the present disclosure regarding the creation of the proxy process 135 and the assignment of security policies to the proxy process 135 created, will be described below.

Figure 2A:
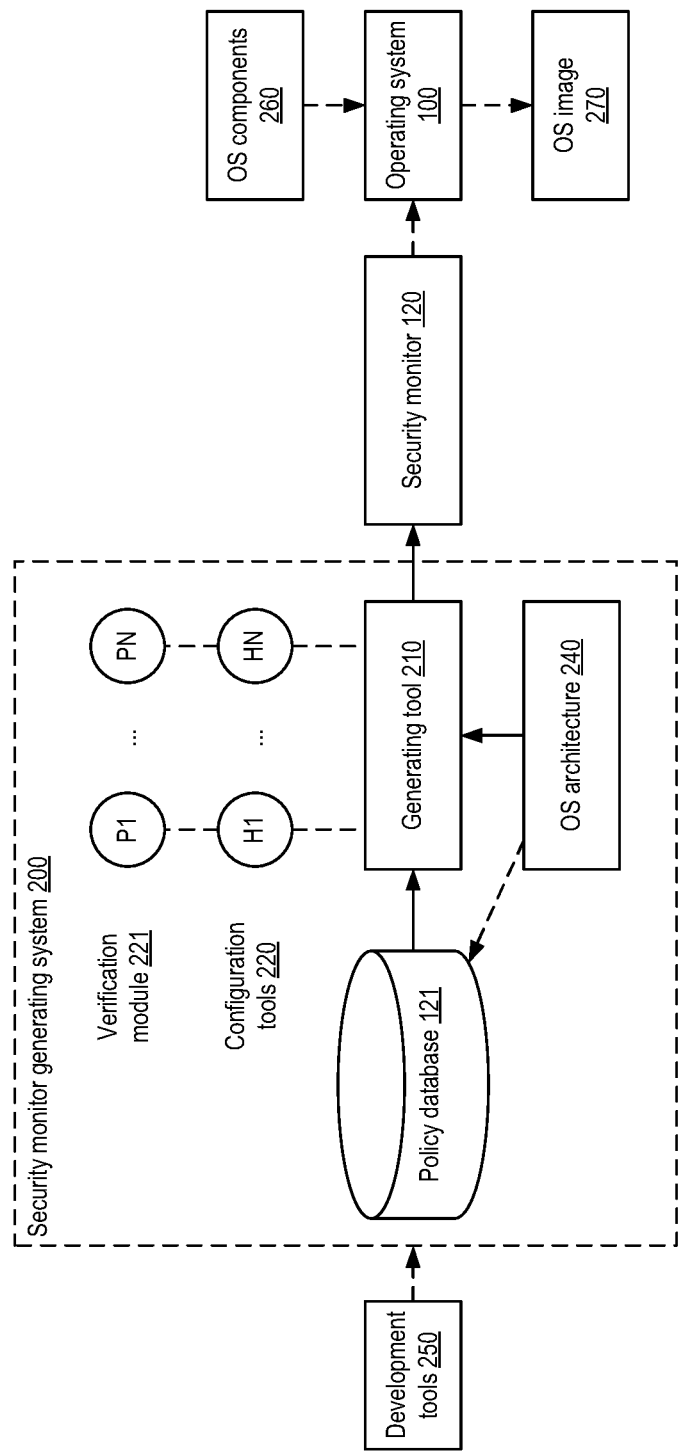
FIG. 2a illustrates an exemplary security monitor generating system in accordance with aspects of the present disclosure.

FIG. 2a illustrates an exemplary security monitor generating system 200 in accordance with aspects of the present disclosure. The security monitor generating system 200 is used to improve the security of the OS 100 when exchanging messages 140 and to perform monitoring of the delivery of said messages 140 to the recipients. In this case, the security monitor 120 can be used by software developers in different operating systems 100 as well as in any other computer systems in which message passing 140 is used, in particular, in databases and in application software. An example of this use was described earlier in conjunction with the descriptions of FIGS. 1a-1b. For each operating system 100, a security monitor 120 is constructed based on features of the OS architecture 240 and by taking account of the security requirements for that operating system 100, as expressed in the security policies. It is worth noting that for various software and firmware development systems based on OS 100 (hereafter referred to as the development system), the main objects of the OS architecture 240 can be shared. For example, processes, services, applications, drivers that are responsible for operating the OS kernel 110, and other components of the operating system 260, can be shared. At the same time, other objects of the OS architecture 240 that are responsible for the functionality of the development system will be different for each of the mentioned systems. Therefore, there will also be different security policies that are used to monitor the delivery of messages 140. Development systems can include software as well as firmware systems.

The system 200 contains the policy database 121 designed to store the security policies required to monitor the delivery of messages 140. The system 200 also contains at least one configuration tool 220 which is designed to configure the corresponding verification module 221 based on the security policies received from the generating tool 210. The verification module 221 is designed to issue a decision 150 on the method for monitoring the delivery of the message 140 (hereafter, the decision) at the request of the security monitor 120, while implementing the security policy. The system 200 also contains a description of the OS architecture 240, which in turn includes OS architecture objects such as the processes and applications of the OS 100.

In one aspect, the mentioned OS architecture objects additionally include objects of the development system based on the OS 100.

In another aspect, the OS architecture objects additionally include:
  a process that represents a service and that includes at least one software component designed to implement the software interface of the given process, wherein communication with the given process takes place by means of the above-mentioned interface (for example, such a service could be an application that translates the flow of external events and requests for the event processing process); and
  a list of software interfaces for each process, wherein the corresponding interface methods which implement the functionality of the corresponding process can be specified.

In another aspect, the OS architecture object is additionally a resource driver—a process that manages resources and access to the resources. In one aspect, the resource is, in particular, a file, port, or process. For example, the file system may be a resource driver, and the files themselves may be resources to which the file system provides access by other processes.

In one aspect, the system 200 further contains a generating tool 210 designed to analyze security policies, where the analysis consists, inter alia, in identifying the processes for which the given security policy is used.

In one aspect, the above analysis takes into account the OS architecture objects 240, including the above-mentioned processes and applications. The generating tool 210 is also designed to select security policies from the policy database 121 for the corresponding configuration tools 220 and to transfer at least one selected security policy to the corresponding configuration tool 220. In one aspect, the generating tool 210 is also designed to generate a security monitor 120 using the configured verification modules 221 obtained from each configuration tool 220, based on the analysis results.

In one aspect, the generating tool 210 generates the security monitor 120 by creating the code of the security monitor 120. In one aspect, the code of the security monitor 120 may be a source code, an intermediate code, or an executable code. In one aspect, the generation of the code of the security monitor 120 may further include code optimization and error analysis. Thus, the generating tool 210 may be the compiler that generates the code in question.

The OS architecture 240, the policy database 121 and the configuration tools 220 can be pre-configured using the development tool 250. To do the pre-configuration, the development tool 250 may provide a set of APIs (application programming interfaces) or plug-in modules for software development. The term "interface" is used hereinafter to refer to the process interface described earlier, and the abbreviation "API" is used hereinafter to refer to the application programming interface.

In one aspect, at least part of the OS architecture 240, part of the security policies from the policy database 121, and part of the configuration tools 220 may be shared (based on templates) across different operating systems 100. In this case, using the development tools 250, the developer may configure the configuration tools 220, the OS architecture 240, and the security policies from the policy database 121. The configuring may be performed by: adding, to the template in question, the security policies in the architecture of the OS 240 that are missing from the template, as well as the configuration tools 220 that are necessary to reflect the features of the OS 100 or the development system based on the OS 100, and the security requirements of the OS 100 or of the development system based on the OS 100, respectively, for which the developer generates the security monitor 120. In addition, some of the data can be deleted from the template in question, if it will not be needed in the OS 100 or in the OS development system 100, respectively. For example, some security policies and applications may be deleted.

The security monitor 120 generated, together with the other components of the OS 260, are also incorporated into the operating system 100. The incorporation of the security monitor 120 and the OS components 260 may be implemented using known techniques, for example, during the compilation stage of the OS 100 using the OS 100 compiler, or by installing the security monitor 120 on the OS 100. As mentioned earlier, the security monitor 120 may be part of the OS kernel 110 or be a separate application of the OS 100. The security monitor 120 runs in a privileged mode on the OS kernel 110. For the OS 100, an OS installation image 270 may also be created to install the OS 100 on end-user computing devices. The OS installation image 270 may be, for example, an archive, an executable file, or an installation package. The installation package is an archive file that includes the files of the OS 100, control files, and optionally, files for configuring the installation process of the OS kernel 110. In addition, the installation package may include system developer files based on the OS 100. These files may be provided as source code, intermediate code, or executable code.

The description of the security policies, in accordance with the teachings of the present disclosure, are provided below.

In one aspect, the security policies use at least one of the following models:
 a. basic operations;
 b. finite state machine;
 c. timed automaton;
 d. role-based access control;
 e. mandatory integrity control;
 f. regular expressions;
 g. discrete event systems (DES);
 h. object capability model (mandatory references); and
 i. temporal logic.

The security policies from the policy database 121 may be defined using a specification language, such as PSL (policy specification language). In the PSL example, mandatory integrity control is defined by the policy class Mandatory_integrity_control. The class (family) of security policies defines a set of rules that match the rules of the model used in the security policy. The security policy specification determines the correspondence of these rules with communications in the system that can be implemented by exchanging messages 140 between processes. For each communication attempt, that is, each time the security monitor 120 verifies the messages 140, the security monitor 120 applies the rules to determine a decision as to the validity of the given communication (delivery of message 140). To use a policy class, a policy object is created based on it, for which the configuration is specified.

In one aspect, the analysis of the security policy and objects of the OS architecture 240 includes at least one of the following types of analysis: lexical analysis, syntactic analysis, semantic analysis. This security policy analysis identifies objects of the OS architecture 240, in particular, the processes involved in the exchange of messages 140, for which the specified security policy applies. That is, a correspondence is determined between the identified objects in the OS architecture 240 and the security policy applied to the specified objects. For example, if a security policy allows a request 142 from process 131 to process 132, an analysis of that security policy identifies specific processes 131-132 and information about the allowed request 142. It is worth noting that as a result of this security policy analysis, other objects of the OS architecture 240 that are verified in the specified security policy may be further identified. For example, when the message 140 is addressed to a specified method, process interface methods will be passed to the specified process interface. In this case, the security policies will verify the requirement that the defined process interfaces and defined interface methods are used when messages 140 are passed between the identified processes.

In the example of the PSL language, which can be used to define security policies in the policy database 121, a reference to the process 131, which is the source of the request 142, may be contained in the variable scr. A reference to the process 132, which is the destination of the request 142, may be contained in the variable dst. Accordingly, it is the above-mentioned analysis of the security policy, written in the PSL language, that will allow identification of the specified OS architecture objects for which the specified security policy will be applied.

In another aspect, the analysis of the security policies also includes verification of the types of the objects of the OS architecture 240, as well as an analysis for errors in the security policies.

The results of the above analysis are taken into account in generating the security monitor 120. For example, the security monitor 120 may record the application conditions of the security policies—a list of objects of the OS architecture 240, in particular processes and security policies corresponding to this list, as well as the verification modules 221. Therefore, when a message 140 is received from the OS kernel 110, the generated security monitor 120 identifies the objects of the OS architecture 240 participating in the message passing 140 and then determines the security policies that are applied to the specified objects of the OS architecture 240. The security monitor 120 then sends the messages 140 to the verification modules 221, which correspond to the specified security policies, to decide on which method to use for monitoring the delivery of the message 140.

In another aspect, a syntactic analysis is carried out by constructing a syntactic tree for the code of the security monitor 120, wherein the syntax tree includes the code of the verification modules 221 generated by the at least one configuration tool 220.

Security policies may use basic operations that allow or prohibit passing of the message 140 on the condition that the parameters of the message 140 (for example, the name of the process to be launched or the actual arguments of the method to be called) match the data specified in the security policy. For example, the security policy might determine that the process 131 may receive any messages 140, but that the process 131 is not allowed to send messages 140.

The security policies may also use a finite state machine, where the security policy determines whether the message 140 is allowed or denied depending on the state of the finite state machine and in accordance with the state transition table of the finite state machine.

The timed automata model, in particular timed automata of the ERA type (event-recording automata), is a special case of finite state machines. In this model, an additional time parameter (timer) is defined for each message 140, equal to the time since the last receipt of this message 140. For example, a transition from one finite state machine state to another state may be made if the message 140 was received after the time determined by the timer.

The Mandatory integrity control model is used to allow or deny the delivery of a message 140. According to the mandatory integrity control model, using the security monitor 120 the objects of the OS architecture 240 involved in passing the message 140, for example, the processes 131-132, are mapped to two numbers called the integrity level and the access level. In the process, security policies based on mandatory integrity control are used to allow the delivery of a message 140 from one object to another, that is, using the values of the integrity levels and the access levels of the objects. For example, a security policy may be used that allows one object to access another object if the value of the access level of the first object is not less than the integrity level of the other. In the PSL specification language, integrity levels and access levels are defined for the mandatory integrity control model.

Thus, to set the integrity levels, an 'integrity' policy object is defined as an instance of the Mandatory_integrity_control class:

```
policy object integrity =
    Mandatory_integrity_control {
        Config {
            levels : ["LOW", "MEDIUM", "HIGH"]
        }
    }
```

The integrity policy object configuration will define three levels of integrity: LOW, MEDIUM, and HIGH, in ascending order. That is, LOW<MEDIUM<HIGH.

Policies based on object capability model (mandatory references) are based on the principle of minimum privileges. This principle of organization of access to resources implies that only privileges that are absolutely necessary for the successful completion of a task are provided to the subject (process or user). For example, a user who wants to find out the contents of a file should only be granted read permission for that file and only for the duration of the use of that file.

To define security policies based on temporal logic, security properties (requirements) are formulated based on a temporal logic formula and using temporal operators. Using the security monitor 120, the OS architecture objects 240 involved in the passing of the message 140, such as the processes 131-132, are mapped to their state events from a predefined set of events.

As an example, the application of security policies based on temporal logic to the software installation process from a software image will be considered. Several components (which are the processes 131-132), such as the verification tool and the installation tool, may be involved in the installation process. The software installation process may include verifying the integrity of the software image by the verification tool and then installing the software from the software image by the installation tool if the integrity of the software image is not compromised. The integrity of the software image determines the consistency, completeness, and integrity of the software image data. The integrity of the software image can be verified by validating the electronic digital signature. For the aforementioned software image, the set of events can include the following: {seal, verify, apply}, where seal is the event of "sealing" the software image, verify is the event of verifying the integrity of the software image, and apply is the event of installing the software from the software image. The security properties are formulated, for example, as follows:

Property 1. Whenever a software image integrity verification is performed, it must be ensured that after the software image integrity verification process, the software image in question will not be changed.

This property can be written as the formula:

$$G(\text{verify} \Rightarrow P \text{ seal}),$$

where G is the temporal operator "always in the future",
P is the temporal operator "at least once in the past".

Property 1 means that whenever the integrity of the software image has been verified in the past, it must be ensured that no further data is written to the software image.

Property 2. Installing the software from a software image is only possible if the integrity of the software image is confirmed. This property can be written as the formula:

$$G(\text{apply} \Rightarrow P \text{ verify}).$$

The construction of a policy class object that implements access control based on temporal logic can be implemented in the PSL language as the following structure:

```
policy object tl_checker = TL {
    config "G (verify => P seal) /\ G (apply => P verify)"
}
```

It is worth noting that other formulations of the properties are also possible. For example, property 2 can be defined as follows: the software image is not applied until the integrity of the software image has been confirmed:

!apply U verify, where U is the temporal operator "until such time as the specified event occurs".

A policy based on a temporal logic model when installing the software associates the apply event with this inter-process communication and verifies the truth of the formula specified in the policy object configuration. If the formula is true, the policy allows the communication, and if false it denies it.

Policies based on a discrete event model are defined using the verification module 221 corresponding to the policies. These security policies may also be described in the PSL specification language. These security policies may be applied to development systems that contain a large number of components. For the system mentioned above, the model with discrete events is a resultant finite state machine which is defined by a combination of a set of finite state machines, each of which describes a separate component of the system. For each finite state machine, the set of its states and transitions between them are indicated when certain events occur. The state of the resultant finite state machine is determined by a combination of the states of the finite state machines of the system components. In this case, the specified combination is implemented, for example, by a synchronous or asynchronous production of finite state machines. For the resultant finite state machine, a list of allowed transitions, a list of allowed states, and a list of prohibited states of the resulting finite state machine are also specified. Accordingly, the security policies are used to verify the transition of the finite state machines of the system components and the resulting finite state machine into the initial state defined in the configuration of the corresponding finite state machine, the transition between states on the occurrence of a specific event, the occupation of one of the defined states by the corresponding finite state machine.

In another aspect, different configuration tools 220 are selected for the security policies that use the different models. For example, the security policies may be combined into policy classes. A security policy class is a set of semantically linked policies that implement a specific security policy model. A first class of policies may consist of security policies that use a finite state machine, and a second class of policies may consist of security policies that use mandatory integrity control. In this example, configuration tool 1 may be selected for security policies from the first class, while configuration tool 2 may be selected for security policies from the second class. The aspects described will allow configuration tools 220 to be developed that are designed to configure verification modules 221 for security policies from a single class. In addition, when adding a new security policy to the policy database 121, the existing configuration tool 220 may be used without the need to redesign the configuration tool 220 or to add a new configuration tool 220.

In another aspect, using the generating tool 210, the security monitor 120 may additionally include a security monitor context 122, wherein the security monitor 120 monitors the delivery of the messages 140 additionally taking account of the context 122, where the security monitor context 122 contains the values of the security policy parameters.

In another aspect, the security monitor is additionally designed to change the context 122 to take into account the decisions 150 that are made based on the security policies. Depending on these models used by the security policies, the context 122 may contain different security policy parameters. For example, for security policies based on the mandatory integrity control model, the context 122 may contain values for integrity levels and access levels to the protected resources. For security policies based on a finite state machine, the context 122 may contain the current value of the state of the finite state machine and the transition table of the finite state machine.

In one aspect, if the message 140 complies with at least two security policies, an overall decision for the security policies in question may additionally be calculated by conjoining the decisions for each of these security policies, wherein the security monitor 120 monitors the delivery of the messages 140 additionally taking account of this general decision. When the process 131 or process 132 initiates a communication by sending the message 140, the security monitor 120 invokes all security policies from the policy database 121 associated with that particular communication. If all security policies have issued an "allowed" decision, then the security monitor 120 issues an overall "allowed" decision. If at least one policy has issued a "prohibited" decision, however, the security monitor 120 issues the overall decision of "prohibited".

In another aspect, the configuration of the verification module 221 involves the creation of code to issue the decision 150 at the request of the security monitor 120 for a security policy when implementing the security policy.

In one aspect, the security monitor 120 monitors the delivery of the message 140 additionally taking account of the decisions 150 based on the security policies related to the messages 140 in question.

Figure 2B:
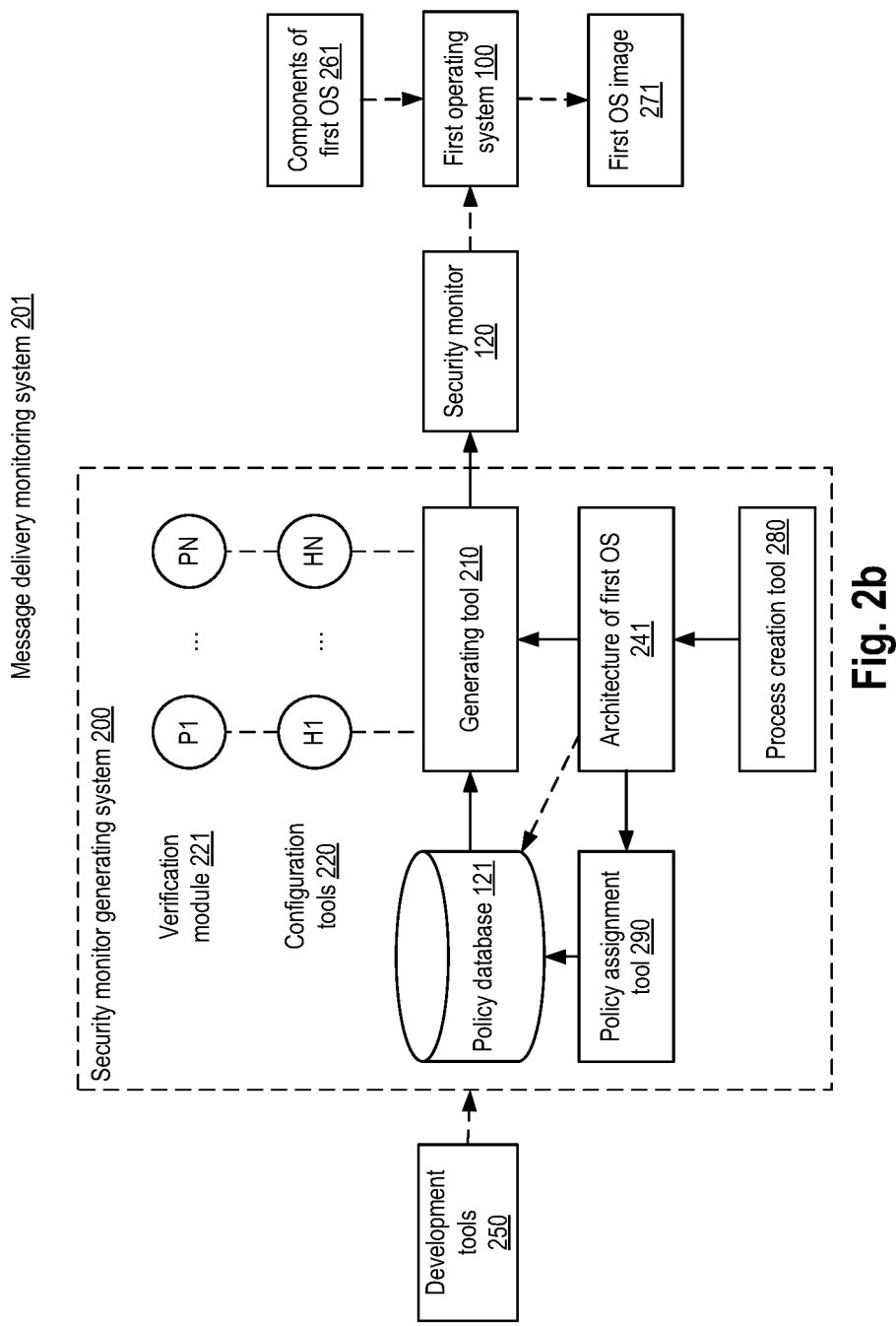
FIG. 2b illustrates an exemplary system for monitoring deliver of inter-process communication messages passed between first and second processes in accordance with aspects of the present disclosure.

FIG. 2b illustrates an exemplary system 200 for monitoring the delivery of inter-process communication messages passed between the first 134 and the second 161 processes in accordance with aspects of the present disclosure. To monitor the delivery of messages 140 passed between the first 134 and the second 161 processes, the security monitor generating system 200 (FIG. 2a) can be used to generate the security monitor 120 for the first OS 100. In this way, the system for monitoring the delivery of messages 201 uses the security monitor generating system 200 and additionally includes a process creation tool 280 and a policy assignment tool 290.

It is worth noting that the tools and modules described, in particular, the configuration tool 220, the generating tool 210, the development tool 250, the process creation tool 280, and the policy assignment tool 290 are implemented with the ability to run on the processor of the computer (see FIG. 5). In this case, the policy database 121, the architecture of the first OS 241, and the verification modules 221 are contained in the memory of the computer.

The process creation tool 280 is designed to create a proxy process 135 for the second process 161, where the proxy process 135 is designed to exchange messages 140 with the second process 161 on the second OS 160 and has a programming interface corresponding to the programming interface of the second process 161. The process creation tool 280 receives information about the second process 161, in particular its programming interfaces, from the development tool 250.

Thus, information about the first process created 134, which communicates with the second process 161 on the second OS 160, may be added to the architecture of the first OS 241 by the process creation tool 280. The policy assignment tool 290 is designed to assign security policies to the created proxy process 135 for monitoring the delivery of messages 140 associated with the proxy process 135, where these messages 140 are passed through a defined programming interface. The security policies assigned to the proxy process 135 may be stored in the policy database 121. Once generated, the security monitor 120 may perform monitoring of the delivery of messages 140 between the first 134 and the second 161 processes, including messages 140 associated with the aforementioned proxy process 135, and the aforementioned monitoring is performed based on the security policy assigned by the policy assignment tool 290.

In one aspect, when monitoring the delivery of messages 140 the security monitor 120 uses the programming interface of the proxy process 135 to determine the allowed messages 140 for the proxy process 135. At the same time, the policy assignment tool 290 is used to define a security policy that prohibits the delivery of messages 140 from the proxy process 135 if an attempt has been detected to deliver messages 140 that are not in the allowed list. The list of allowed messages 140 and the associated security policies are pre-defined using the policy assignment tool 290 when generating the security monitor 120. In another aspect, when monitoring the delivery of messages 140, the security monitor 120 uses the programming interface of the proxy process 135 to determine the list of processes which are allowed to exchange messages 140 with the proxy process 135. The list of processes includes at least the first process 134. The policy assignment tool 290 also assigns a security policy that prevents the exchange of messages 140 between the proxy process 135 and processes that are not on the aforementioned list. Valid structures of allowed messages 140 may be defined using a declarative description of the second process interface 161. These structures may contain the size of the message 140, valid arguments and other valid parameters of the message 140.

Thus, to implement inter-process communications of the second process 161 with the first process 134 using the method of the present disclosure, a proxy process 135 is created. The proxy process 135 implements all the programming interfaces of the second process 161. Security policies are assigned for the created proxy process 135 for monitoring the delivery of messages 140 between the second 161 and the first 134 processes via the allowed interfaces. The system of the present disclosure allows the security monitor 120 to monitor the delivery of messages 140 between the second 161 and the first 134 processes by monitoring the delivery of messages 140 associated with the aforementioned proxy process 135, taking into account the security policy, even despite the presence of an insecure communication channel 170. As a result of this, the technical problem described in the present disclosure is addressed.

In another aspect, for the processes 161 and 162 of the second OS 160, between which there is a software interface for exchanging messages 140, the process creation tool 280 is used to create a single proxy process 135 common to both of the aforementioned processes 161 and 162. It is worth noting that if the processes 161-162 are not linked to each other, that is, they are separate security domains, then a separate proxy process will be created for each one. For example, for the second process 161 a proxy process 135 will be created for communication with the first process 134. And for the third process 162, another proxy process (not shown in the figure) will be created for communication with another process (not shown in the figure) in the first OS 100.

In one aspect, the second OS 160 is one of:
a) a guest OS running on a virtual machine under the control of the first OS 100 on a computer;
b) a guest OS running on a virtual machine, the first OS 100 being a second guest OS running on a second virtual machine and connected to the first virtual machine by means of a hypervisor;
c) a second OS 160 on a second computer that is connected to the computer on which the first OS 100 is running, over a network or via other communication channels 170.

In one aspect, when the second process 161 contains more than one execution thread, for each thread in the second process 161, a corresponding thread is created in the proxy process 135. In this case, the thread of the second process 161, which performs the exchange of inter-process communication messages, calls the driver method of the communication channel 170 (using system calls to I/O operations, such as ioctl), which in turn notifies the proxy process 135 that a thread must be created in the proxy process 135 to exchange inter-process communication messages between the process and the corresponding thread of the second process 161. After completion of the exchange of messages 140 between the threads of the second process 161 and the proxy process 135, the second process 161, by calling the driver method of the communication channel 170, notifies the proxy process 135 about the completion of the exchange of messages 140 with it. The proxy process 135 then terminates the execution of the corresponding thread in the proxy process 135.

The communication channel 170 driver is designed to establish a communication channel 170 between the second process 161 and the proxy process 135, to control the threads for the proxy process 135, to implement the call( ), recv( ), reply( ) calls, wherein the programming interface of the proxy process 135 corresponds to the interface of the second process 161, and also to deliver the messages 140 from the second process 161 to the corresponding thread of the proxy process 135.

It is also worth noting that when creating proxy processes, for example, the proxy process 135, a common proxy-process template may be used for different processes of the second OS 160, but for different processes of the second OS 160 a software interface corresponding to the interface of the second process 161 will be implemented in the corresponding proxy process. Thus, the use of a common proxy-process template increases the security of the claimed invention by allowing the possibility of a more detailed verification of the code of the specified template, as well as the use of common security policies. However, although some security policies may be the same for different processes in the second OS 160, some of the security policies may be different.

Figure 3A:
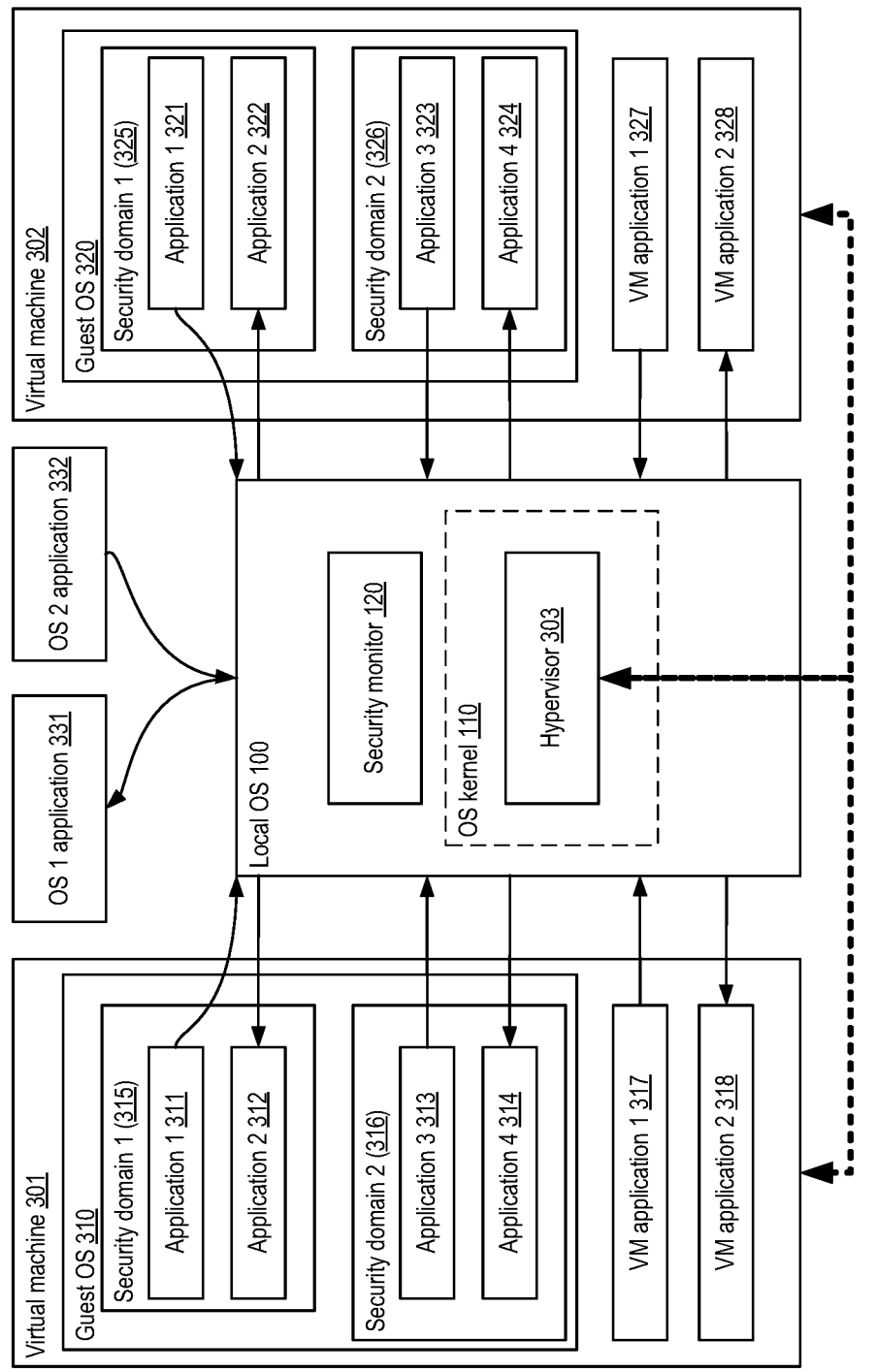
FIG. 3a illustrates an exemplary of a guest OS (second OS) running on a virtual machine under control of a first OS on a computer system in accordance with aspects of the present disclosure.

FIG. 3a illustrates an exemplary of a guest OS (second OS 160) running on a virtual machine under control of a first OS 100 on a computer system (an example of a general-purpose computer 20 is illustrated in FIG. 5) in accordance with aspects of the present disclosure. The first OS 100 has a hypervisor 303 installed, which is a module (service) of the OS kernel 110 and controls the virtual machines 301-302. The aforementioned virtual machines 301-302 are applications of the first OS 100, which run in the user space on the processor of the computer. The hypervisor 303 may use any known virtualization solution to operate the virtual machines. An example of a hypervisor 303 is a Kaspersky Secure Hypervisor (KSH), a secure virtualization system based on the second type of hypervisor, where the first OS 100 (for example, KasperskyOS) acts as a host machine. In this case, the hypervisor 303 exports the component interface which uses the virtual machines 301-302 to manage the sessions, the virtual processors, memory, and low-level device polling. In addition to the virtual machines, other applications 331-332 may run on the first OS 100. In a preferred aspect, the aforementioned applications 331-332 and virtual machines 301-302 contain one process each, but may also be implemented using multiple processes and run on the processor of the computer.

In the context of a virtual machine application 301, a virtual machine running a guest OS 310 is created, which then controls the operation of guest functional components that are implemented using guest processes and applications. As an example, the applications 311-314 are created in the guest OS 310, divided over two security domains 315-316. In general, the functional components of the guest OS 310 run in different security domains, with the guest OS 310 providing isolation of these security domains and the hypervisor 303 providing isolation of the guest OS 310 from the virtual machines represented by the applications 317-318. Similarly, in the context of the virtual machine application 302 a virtual machine with guest OS 320 is created.

The delivery of messages 140 for inter-process communication from the various security domains 315-316 of the guest OS 310 and also from the virtual machine application 301, which is a separate security domain, are monitored by the security monitor 120 of the first OS 100 independently using the proxy processes created for each security domain. Similarly, the security monitor 120 monitors the delivery of messages 140 from the virtual machine application 302 and from the security domains 325-326 of the guest OS 320. In this case, the virtual machine 301 monitors the communication between the security domains 315-316 within the guest OS 310, monitors its own security policies within the virtual machine 301, controls access to the guest OS 310 hardware, data flows for the emulated devices, and other communications within the guest OS 310.

The communications monitored by the security module 120 are indicated in FIG. 3*a* by a solid line with arrows. The communications that are not monitored by the security monitor 120 are indicated in FIG. 3*a* by a dashed line—for example, communications between the hypervisor 303 and the virtual machines 301-302 that require the privileged mode of the OS kernel 100, which cannot be implemented in user mode in applications of the virtual machines 301-302. In this case, the communications between the different virtual machines 301-302 are also monitored by the security monitor 120.

Figure 3B:
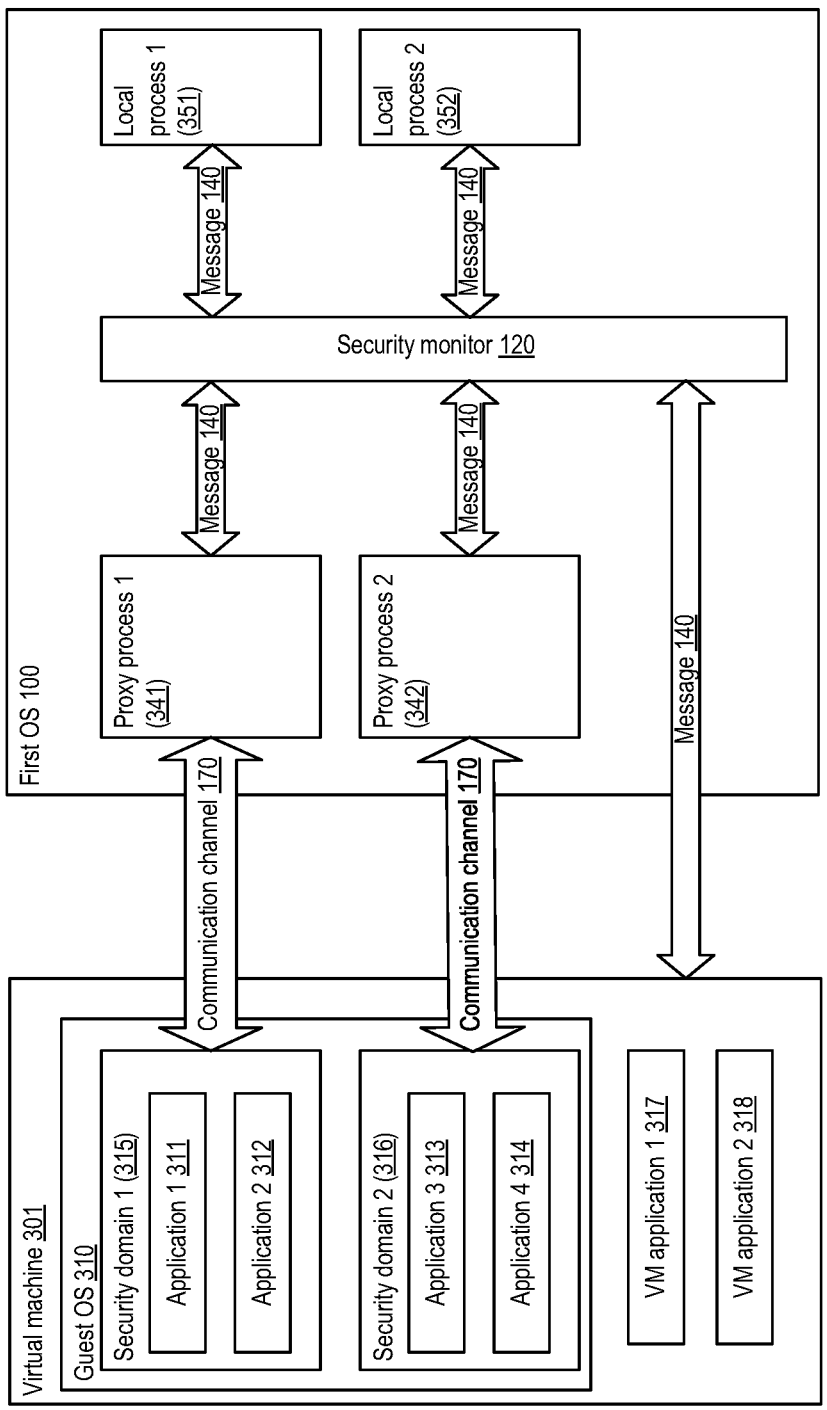
FIG. 3b illustrates an exemplary of creating a proxy process for a virtual machine and security domains for the guest OS (the second OS) in accordance with aspects of the present disclosure.

FIG. 3*b* illustrates an exemplary of creating a proxy process for a virtual machine 301 and security domains for the guest OS (the second OS 310) in accordance with aspects of the present disclosure. For example, the proxy process 341 may be created for the security domain 315 and the proxy process 342 may be created for the security domain 316. The created proxy processes 341-342 communicate with other processes of the first OS 100 using inter-process communication messages 140. The delivery of the inter-process communication messages is monitored by the security monitor 120. The virtual machine 301, as a separate security domain and as a process of the first OS 100, communicates with other processes of the first OS 100 via the messages 140, the delivery of which is also monitored by the security monitor 120. In other words, the virtual machine 301 does not require a separate proxy process to be created. It is also worth noting that the created proxy processes 341-342 will have programming interfaces that correspond to the programming interfaces of the security domain 315 and the security domain 316 respectively.

As described earlier, the messages 140 are sent and received by the processes of the first OS 100 using system calls to the OS kernel 110 and via the defined programming interfaces.

The system calls may include the following:
call( ): used by process 131 to send a request 142 to process 132 and receive a reply 143 to perform inter-process communication;
recv( ): used by process 132 to receive the request 142; and
reply( ): used by process 132 to send the reply 143 to process 131.

In one aspect, the system call reply( ) is executed in the same process thread in which the call recv( ) was executed.

To identify the recipient and the sender of the messages 140 in the guest OS 310, unique identifiers are used. The values of the unique identifiers are equal to the values of the process descriptors used by the proxy processes 341-342 for exchanging the messages 140 in the first OS 100.

In a preferred aspect, the messages 140 generated by the second process as well as other processes of the guest OS 310 (in this example, security domains 315-316 and the virtual machine application 301) are represented in the format of the messages 140 passed in the first OS 100. In this case, the corresponding proxy processes 341-342, having received messages 140 from the processes of the guest OS 310, being the second OS 160 (security domains 315-316), perform the subsequent sending of messages 140 to the corresponding processes 351-352 of the first OS 100 without modification. In another aspect, when the format of messages 140 from the processes of the second OS 160 differs from the format of the messages 140, the proxy process may convert the messages 140 from the processes of the second OS 160 into the format of the messages 140.

When a second process, such as the security domain 315 in the guest OS 310, accesses the process 351 of the first OS 100, the security domain 315 receives a process descriptor 351 and sends a message 140 to the proxy process 341 via the communication channel 170 (remote call to call( )). The security domain 315 then transitions to a sleep state until the reply( ) message is received from the proxy process 341. The proxy process 341, having received the specified message, converts the received specified message into the message 140 and sends the message 140 to the process 351 using a system call of the OS kernel 100. The delivery of the message 140 is then monitored by the security monitor 120 using the security policies assigned to the proxy process 341 and the process 351. Messages 140 from the process 351 to the security domain 315 are sent in a similar way using the proxy process 341 under the control of the security monitor 120. After receiving the message 140, the security domain 315 wakes up from the sleep state and terminates the invocation of call( ).

It is worth noting that this communication is carried out via the programming interfaces of the security domain 315 and the corresponding software interface of the proxy process 341. The programming interface of security domain 315 receives a set of descriptors required for exchanging messages 140. The values of set of descriptors required for exchanging messages 140 correspond to the descriptors of the proxy process 341. The execution thread of the security domain 315 uses the recv( ) call on the specified interface to the proxy process 341, after which the specified execution thread transitions to the sleep mode. A recv( ) call by the execution thread of the security domain 315 leads to a system call recv( ) by the kernel of the first OS 110, which initiates the proxy process 341. The proxy process 341 then also goes into the sleep mode. After the proxy process 341 receives the call to call( ) from the security domain 315 (for example, from another execution thread), the proxy process 341 wakes up from the sleep state, and the security domain 315 sends the data received earlier during the recv( ) call via the corresponding programming interface. The security domain 315 also wakes up from the sleep state and receives the data received in the recv( ) call from the proxy process 341. The security domain 315 handles the call in the same thread that performed the recv( ) call and sends the data using the reply( ) call. The proxy process 341, after receiving this data, sends the received data to the security domain 315. To conduct multithreaded exchange of messages 140 between the second process (security domain 315) and the proxy process 341, a service thread of the proxy process is created for each thread of the second process.

In a particular aspect, the proxy-process interface may include the following calls:
  method( ): designed to obtain a thread identifier, a descriptor of the shared memory range and an offset within the limits of this descriptor; the processing of this method is performed in a separate thread of the proxy process; and
  event( ): designed to wait for events and return event descriptors; processing of this method is performed by a separate thread of the proxy process, wherein the aforementioned events include answering responses to the calls to call( ) and receiving requests from the processes of the second OS 160 while waiting in the sleep state for a recv( ) call.

The event descriptors contain information about the event, including the type of event (call( ), recv( )), the identifier of the proxy process thread in which the event occurred, the descriptor of the shared memory range in which the data was received, and so on. If there are no items in the event buffer, the wait for the event takes place in the event( ) call. If the event buffer contains elements, the event( ) call returns the descriptor from the specified buffer.

FIG. 4 illustrates a method 400 for monitoring delivery of messages 140 passed between first and second processes in accordance with aspects of the present disclosure. For example, method 400 may monitor delivery of messages between the first process 134 and the second process 161. Method 400 starts in step 405 and proceeds to step 410.

In step 410, using the process creation tool 280 for the second process 161, method 400 creates a proxy process 135 in a first OS 100 for a second process, wherein the second process is from a second OS. For example, the created proxy process 135 is designed to exchange messages 140 with a second process 161 on the second OS 160. In one aspect, the created proxy process 135 has a programming interface corresponding to a programming interface of the second process 161.

In step 420, using the policy assignment tool 290, method 400 assigns at least one security policy to the created proxy process 135 for monitoring delivery of messages 140 associated with the created proxy process 135, where the messages 140 are transmitted through the programming interface corresponding to a programming interface of the second process 161.

In step 430, for the first OS 100, method 400 generates a security monitor 120 based on the created proxy process 135 and the security policies of the first OS 100. The security requirements are expressed in the assigned security policies which are obtained from a policy database 121. Thus, the security monitor 120 is based on features of the OS architecture 240, which include at least the created proxy process 135 and the security requirements of the first OS 100.

In step 440, by the generated security monitor 120, method 400 monitors the delivery of messages 140 between at least the first process 134 and the second process 161, wherein the monitoring of the delivery of messages 140 associated with the proxy process 135 is based on the security policies obtained from the policy database 121. It is worth noting that the particular aspects disclosed above also apply to the method shown in FIG. 4.

FIG. 5 is a block diagram illustrating a computer system 20 on which aspects of systems and methods for monitoring delivery of messages passed between first and second processes may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for monitoring delivery of messages passed between processes from different operating systems (OS), the method comprising:
   creating a proxy process in a first Operating System OS for a second process from a second OS, the first and second OS are installed in respective computing environments, wherein the proxy process includes a programming interface corresponding to the programming interface of the second process;
   assigning at least one security policy to the proxy process for monitoring delivery of messages associated with the proxy process, where the messages are transmitted through the programming interface of the proxy process corresponding to the programming interface of the second process;
   generating a security monitor for the first OS based on the proxy process and security policies of the first OS, wherein the security monitor runs in a privileged mode on the first OS; and
   monitoring, using the security monitor, the delivery of messages between at least a first process in the first OS and the second process of the second OS via the programming interface of the proxy process, wherein the monitoring of the delivery of messages associated with the proxy process is based on the security policies.

2. The method of claim 1, wherein the monitoring and controlling the delivery of messages includes, for each message, at least allowing or prohibiting the delivery of the message.

3. The method of claim 1,
   wherein the monitoring, by the security monitor, the delivery of messages includes, analyzing messages using at least one of lexical analysis, syntactic analysis, and semantic analysis.

4. The method of claim 1, wherein the second OS comprises at least one of:
   a guest OS running on a virtual machine under a control of the first OS on a first computer;
   a guest OS running on a virtual machine, the first OS being a second guest OS running on a second virtual machine and connected to the first virtual machine through a hypervisor; and
   a second OS on a second computer that is connected to the first computer that is running the first OS over a network.

5. The method of claim 1, wherein the security policies are based on a finite state machine model and/or timed automata model,
   where the security policy determines whether the message is authorized or prohibited based on the state of the finite state machine and in accordance with a state transition table, which specifies a list of allowed transitions, a list of allowed states, and a list of prohibited states, and
   wherein the timed automata model specifies a timer for each message, set to the time since the last receipt of this message, whereby a transition from one finite state machine state to another state is made if the message was received after the time determined by the timer.

6. The method of claim 1, wherein the security monitor is generated based on features of an architecture of the first OS, the features including at least the created proxy process and the security policies assigned to the proxy process, the security policies being obtained from a security policy database.

7. The method of claim 1, wherein the security policies are based on a mandatory integrity control model in which each process is assigned values for the integrity level and the access level, and the security monitor may allow the first process to communicate with the second process if the value of the access level of the first process is not less than the integrity level of the second process.

8. The method of claim 1,
   wherein, when monitoring the delivery of messages, the security monitor uses the programming interface of the proxy process to determine allowed messages for the proxy process, and
   wherein a policy assignment tool is used to additionally specify a list of allowed messages according to the programming interface and to assign a security policy that prohibits the delivery of messages from the proxy process, when the security monitor detects an attempt to deliver messages that are not in the list of allowed messages.

9. The method of claim 1,
   wherein, when monitoring the delivery of messages, the security monitor uses the programming interface of the proxy process to determine a list of processes with which the proxy process is allowed to exchange messages, and
   wherein a policy assignment tool is used to additionally assign a security policy that prohibits messages from being exchanged between the proxy process and processes that are not in the list of processes, wherein the list of processes includes at least the first process.

10. The method of claim 1, wherein the proxy process is created for at least two processes of the second OS when a programming interface for exchanging messages exists between said at least two processes of the second OS.

11. The method of claim 1, wherein the security policies combined into policy classes, each class containing two or more semantically linked policies that implement one or more security policy models selected from the list of: basic operations; a finite state machine; a timed automation; a role-based access control; a mandatory integrity control; regular expressions; discrete events; object capability model; and a temporal logic.

12. A system for monitoring delivery of messages passed between processes from different operating systems, comprising:
at least one processor of a first computer configured to:
create a proxy process in a first OS for a second process; from a second OS, the first and second OS are installed in respective computing environments, wherein the proxy process includes a programming interface corresponding to the programming interface of the second process;
assign at least one security policy to the proxy process for monitoring delivery of messages associated with the proxy process, where the messages are transmitted through the programming interface of the proxy process corresponding to the programming interface of the second process;
generate a security monitor for the first OS based on the proxy process and security policies of the first OS, wherein the security monitor runs in a privileged mode on the first OS; and
monitor, using the security monitor, the delivery of messages between at least a first process in the first OS and the second process of the second OS via the programming interface of the proxy process, wherein the monitoring of the delivery of messages associated with the proxy process is based on the security policies.

13. The system of claim 12, wherein the monitoring and controlling the delivery of messages includes, for each message, at least allowing or prohibiting the delivery of the message.

14. The system of claim 12, wherein the monitoring, by the security monitor, the delivery of messages includes, analyzing messages using at least one of lexical analysis, syntactic analysis, and semantic analysis.

15. The system of claim 12, wherein the second OS comprises at least one of:
a guest OS running on a virtual machine under a control of the first OS on a first computer;
a guest OS running on a virtual machine, the first OS being a second guest OS running on a second virtual machine and connected to the first virtual machine through a hypervisor; and
a second OS on a second computer that is connected to the first computer that is running the first OS over a network.

16. The system of claim 12, wherein the security policies are based on a finite state machine model and/or timed automata model,
where the security policy determines whether the message is authorized or prohibited based on the state of the finite state machine and in accordance with a state transition table, which specifies a list of allowed transitions, a list of allowed states, and a list of prohibited states, and
wherein the timed automata model specifies a timer for each message, set to the time since the last receipt of this message, whereby a transition from one finite state machine state to another state is made if the message was received after the time determined by the timer.

17. The system of claim 12, wherein the security monitor is generated based on features of an architecture of the first OS, the features including at least the created proxy process and the security policies assigned to the proxy process, the security policies being obtained from a security policy database.

18. The system of claim 12, wherein the security policies are based on a mandatory integrity control model in which each process is assigned values for the integrity level and the access level, and the security monitor may allow the first process to communicate with the second process if the value of the access level of the first process is not less than the integrity level of the second process.

19. The system of claim 12,
wherein, when monitoring the delivery of messages, the security monitor uses the programming interface of the proxy process to determine allowed messages for the proxy process, and
wherein a policy assignment tool is used to additionally specify a list of allowed messages according to the programming interface and to assign a security policy that prohibits the delivery of messages from the proxy process, when the security monitor detects an attempt to deliver messages that are not in the list of allowed messages.

20. A non-transitory computer readable medium storing thereon computer executable instructions for monitoring delivery of messages passed between processes from different operating systems, including instructions for:
creating a proxy process in a first OS for a second process from a second OS, the first and second OS are installed in respective computing environments, wherein the proxy process includes a programming interface corresponding to the programming interface of the second process;
assigning at least one security policy to the proxy process for monitoring delivery of messages associated with the proxy process, where the messages are transmitted through the programming interface of the proxy process corresponding to the programming interface of the second process;
generating a security monitor for the first OS based on the proxy process and security policies of the first OS, wherein the security monitor runs in a privileged mode on the first OS; and
monitoring, using the security monitor, the delivery of messages between at least a first process in the first OS and the second process of the second OS via the programming interface of the proxy process, wherein the monitoring of the delivery of messages associated with the proxy process is based on the security policies.

* * * * *